United States Patent [19]

Smith

[11] Patent Number: 4,525,490

[45] Date of Patent: Jun. 25, 1985

[54] HIGH TEAR STRENGTH FLEXIBLE URETHANE FOAM COMPOSITION AND METHOD OF PREPARATION

[75] Inventor: Stuart B. Smith, Conyers, Ga.

[73] Assignee: Thermocell Development, Ltd., Knoxville, Tenn.

[21] Appl. No.: 627,191

[22] Filed: Jul. 2, 1984

[51] Int. Cl.$^3$ .................. C08G 18/14; C08G 18/32; C08G 18/48

[52] U.S. Cl. .................. 521/124; 521/125; 521/131; 521/176; 521/902; 521/914; 252/182

[58] Field of Search .............. 521/902, 914, 131, 124, 521/125, 107, 176; 252/182

[56] References Cited

U.S. PATENT DOCUMENTS

| | | | |
|---|---|---|---|
| 3,336,242 | 8/1967 | Hampson et al. | 521/914 |
| 3,385,807 | 5/1968 | Herdlein et al. | 521/914 |
| 4,301,110 | 11/1981 | Cuscurida et al. | 521/176 |
| 4,365,025 | 12/1982 | Murch et al. | 521/914 |
| 4,393,015 | 7/1983 | Kaneda et al. | 521/902 |
| 4,436,841 | 3/1984 | Rasshofer et al. | 521/914 |
| 4,452,829 | 6/1984 | Smith | 521/902 |

*Primary Examiner*—Herbert S. Cockeram
*Attorney, Agent, or Firm*—Richard P. Crowley

[57] ABSTRACT

A flexible polyurethane foam composition characterized by high tensile or tear strength is prepared by reacting an MDI prepolymer, prepared by reacting a MDI having a low functionality with an ethylene oxide-capped polypropylene glycol polyol, with a small amount of a tetraethylene glycol as a cross-linking agent and an ethylene oxide-capped polypropylene glycol polyol, the reaction carried out in the presence of a blowing amount of a blowing agent, such as water or a halocarbon, and a catalytic amount of a polyurethane catalyst, such as a combination of an amine and tetravalent tin catalyst. The addition of a small amount of a chlorinated phosphate flame-retardant agent mixed with the reaction provides for a polyurethane foam composition of good fire retardancy and which when exposed to open flame does not melt, but chars. Further, the addition of a trimerization catalyst provides a foam composition with reduced shrinkage.

22 Claims, No Drawings

HIGH TEAR STRENGTH FLEXIBLE URETHANE FOAM COMPOSITION AND METHOD OF PREPARATION

BACKGROUND OF THE INVENTION

Flexible polyurethane foam compositions are typically prepared by employing toluene diisocyanate (TDI), which toluene diisocyanate based foam composition today represents over 90 percent of the flexible foam and polyurethane market. The remaining portion of the market generally uses MDI based foams generally for special seeding applications. While these MDI based polyurethane foams are satisfactory for many purposes and although they have high hardness, such MDI based foams are characterized by poor tear strength or low tensile strength. It is, therefor, desirable to prepare a flexible polyurethane foam employing MDI which has a high tear strength or high tensile strength as well as having excellent shrinkage and flame-retardancy characteristics with high resiliency and being either open cell or closed cell in nature.

SUMMARY OF THE INVENTION

The invention relates to a flexible polyurethane foam composition characterized by high tear strength or high tensile strength and to the method of preparing such MDI based polyurethane foam compositions.

The invention relates to a high tear or tensile strength polyurethane MDI based flexible foam composition and method of preparation prepared by reacting a prepolymer prepared from a low functionality MDI and an ethylene oxide-capped polypropylene glycol polyol with a combination of a high ethylene oxide-capped polypropylene glycol polyol, together with a small amount of tetraethylene glycol in the presence of a blowing amount of a blowing agent and a catalytic amount of a urethane catalyst and optionally a small amount of a fine or closed cell promoter such as a silicone material.

In one embodiment the polyurethane foam compositions of the invention are directed to flexible, open-cell MDI based foam compositions having a high resiliency and having a foam density of typically greater than about 1 pound per cubic foot to about 6 pounds per cubic foot and more typically about 1½ to 4 pounds per cubic foot, which foam is particularly suitable for use in applications where a fine cell, high tensile strength, flexible, open-cell foam is required, such as for use in seating, cushioning, bedding, packaging and similar applications.

In another embodiment the polyurethane foam compositions of the invention are directed to a high resiliency flexible MDI based foam composition similar to the one embodiment; however, such foam compositions are closed cell foam compositions with a high K factor for insulation purposes and with significantly reduced shrinkage properties coupled with high tear strength. The closed cell foam compositions are prepared employing a halocarbon blowing agent and optionally a small amount of a silicone material to induce a closed cell structure to provide a closed cell foam having a K factor of 0.30 or greater, such as 0.35 compared to similar rigid closed cell urethane foams having a K factor of about 0.16. Further and importantly, the closed cell foam is prepared in the presence of a trimerization catalyst, and typically, high levels of a trimerization catalyst to provide a high tear strength foam with drastically reduced shrinkage. The preparation of flexible foam compositions of high strength often result in shrinkage of 25 to 30%. It has been discovered that the shrinkage problem of such MDI based high tear strength foam compositions can be reduced by the use of high levels of a trimerization catalyst, such as a metal-organo catalyst like potassium octoate.

Flexible foam compositions particularly insulation-type, closed cell foam is advantageous for use in spraying onto walls and roofs for insulation purposes. The high level of flexibility makes the foam composition solid as a roofing foam particularly for metal buildings. Rigid-type foam tends to shear or delaminate, because the rigid foam cannot move with movement of the walls or roof, thus leading to delamination. In addition, the closed cell flexible foam compositions are useful in preparing packaging and for floatation devices.

The flexible foam compositions of the invention are useful as sprayable foams, typically by fixed-volume spray equipment of equal volume A and B side mixtures.

The spray foam reactivity required for the market is quite low, such as less than about 2 seconds or less so the reactive composition may be sprayed on vertical wall surfaces without running. It has been discovered that reaction accelerators to speed reactivity are desirable, such as the use of polyvalent metal salts like organo-lead salts, such as lead octoate particularly in combination with the trimerization catalyst comprises an excellent reactivity system.

It has been found that open-cell MDI based flexible foam compositions of low density prepared by the reaction of an ethylene oxide-capped polypropylene glycol polyol and a low functionality MDI to produce a excellent resilient open-cell foam, the foam compositions so prepared have poor fire resistance in that they slowly burn and further have only fair to poor tear strength.

Further, it has been discovered that such foam compositions, even when a small amount of a tetraethylene glycol is added to increase the cross linking and to help aid in improving the tear or tensile strength of the foam still produces a open cell, flexible polyurethane foam with unacceptable tear or tensile strength. However, it has been discovered in accordance with the invention that MDI based flexible polyurethane foam compositions prepared through the reaction of a prepolymer with an ethylene capped polyol, such as an ethylene oxide-capped polypropylene glycol polyol, together with a small amount of a tetraethylene glycol provides for a flexible foam of significantly improved tear and tensile strength. The optional addition of small amounts of flame-retardant agents of such foam preparations, such as the employment of a chlorinated or phosphate-type flame-retardant agent and more particularly a chlorinated phosphate flame-retardant agents imparts good fire and flame characteristics to the resulting foam so as to produce a flexible, open-cell MDI based foam composition which on exposure to an open flame chars and does not melt.

In the preparation of the MDI based flexible foam compositions of the invention, the prepolymers are prepared by employing a low functionality MDI reacted with an ethylene oxide capped polyol. The components of the prepolymer compostion are mixed and then heated typically to above 150° F., for example 170° to 190° F. for a period of time to affect the desired reaction and generally from about 1 to 4, typically 1½ to 2½ hours. Generally the free NCO in the prepolymer is low and ranges from about 12 to 18 percent. The amount of ethylene oxide-capped polyol employed may vary. Low amounts of the polyol and high amounts of the MDI provide for a stiffer foam, while high amounts of the polyol and low amounts of the MDI provide a more elastic foam. Generally the prepolymer is made by reacting 100 parts by weight of the low functionality MDI with about 35 to 70 parts by weight of the ethylene oxide-capped polyol and more typically from about 40 to 65 parts by weight. The prepolymer is preferably prepared employing the same or similar polyols as the ethylene oxide-capped polyol employed in the reactive polyol on the B side of the reaction.

The low functionality MDI employed has an average functionality of about 2.4 or less and typically less than about 2.2 and generally ranging from about 1.9 to 2.2. in average functionality. The low functionality MDI, for example, may be methylene dipara phenyleneiisocyanate, such as diphenylmethane 4.4'-diisocyanate.

The high ethylene capped polyol employed in preparing the flexible foam compositions of the invention comprises an ethylene oxide-capped polyalkylene polyol such as an ethylene oxide-capped polypropylene polyol generally employed in reaction injection molding polyurethane techniques, such as for example, having a hydroxyl number ranging from about 25 to about 50, such as from 30 to 45. The amount of the ethylene oxide-capped polyol on the B side may vary, but typically is an amount sufficient to react stoichiometrically with the free diisocyanate in the prepolymer and generally comprises from 5 to 25 percent in excess of such stoichiometric amount.

The flexible foam compositions of the invention are prepared employing a small amount of an agent to increase cross-linking and to improve the tensile strength of the foam such as the use of a small amount of a tetraethylene glycol additive agent generally in an amount ranging from about 2 to 15 parts per 100 parts of the MDI and more generally from about 3 to 8 parts per 100 parts of MDI. The tetraethylene glycol has a hydroxyl number ranging from about 525 to 550.

The reaction of the prepolymer on the A side and the ethylene oxide-capped polyol on the B side is carried out in the presence of a blowing amount of a blowing agent and a catalytic amount of a polurethane catalyst generally added to the B side. The blowing agent may comprise water for an open cell foam noninsulation type, or if desired for closed cell insulation foam, a liquid low volatility blowing agent may be employed, such as the employment of halocarbons such as the fluoro and chloro methane and ethane carbons such as Freon-type blowing agents (Freon is a registered trademark of Du Pont de Nemours, E. I. & Co.) The amount of water employed in the composition as a blowing agent to react with the free issocyanate to generate carbon dioxide ranges from about 0.5 to 6 parts per 100 parts of the MDI and more generally about 2 to 5 parts. Halocarbon blowing agents may be added; however, the addition of such halocarbon blowing agents tend to make the resulting foam less resilient and generally would include from about 0.1 to 2 parts per 100 parts of MDI of the halocarbon such as the fluoro or fluorochloro carbon in combination with the water.

Where a closed cell insulation-type flexible foam composition is desired, the blowing agent comprises only a halocarbon in an amount of from about 1 to 30 parts; e.g. 2 to 15 parts per 100 parts of MDI or sufficient to provide a closed cell foam with a K factor of 0.25 or greater.

The reaction is carried out in the presence of a polyurethane catalyst to promote the reaction. Generally a combination of catalysts are employed typically an amine catalyst in combination with an organometallic catalyst and more particularly the reaction is carried out in the presence of a Dabco-type catalyst such as polyamine such as a diamine and more particularly a polyethylene diamine like trimethylene diamine in combination with a tin catalyst such as an organo-tetravalent tin catalyst such as an alkyl fatty acid tetravalent tin like tin dialkyl difatty acid, e.g. tin dibutyl dilauryl salt. The amount of catalysts to be employed varies as required, but generally ranges in total from about 0.05 to 3 parts by weight per 100 parts of the MDI, and more generally 0.2 to 2 parts per weight.

Optionally, in order to provide for a fine cell, open cell, uniform cell, foam composition minor amounts of a cell control agent is employed and more typically a silicone or a silicone polymer of a silicone glycol polymer in the amount ranging from about 0.3 to 3 parts by weight per 100 parts of MDI. The silicone material may be liquid for open or closed cell systems.

Optionally, but preferably, a flame-retardant agent is added to improve fire and flame resistance properties of the resulting foam and generally a chlorinated flame-retardant or a phosphate flame-retardant, or preferably a chlorinated phosphate flame-retardant agent is employed in an amount sufficient to impart the desired fire resistance properties of the resulting foam. Generally from about 2 to 12 parts by weight per 100 parts of the MDI such as for example 4 to 8 parts by weight of a flame-retardant are employed to achieve acceptable flame-retardancy.

The foam compositions prepared in accordance with the invention show excellent characteristics as regards fire resiliency and tear strength, from being over 95 to 98 percent open cell or closed cell and provide for a MDI based flexible foam.

Where a substantially closed cell insulation foam composition is desired with reduced shrinkage, a trimerization catalyst typically a alkali metal-organo catalyst more particularly a potassium $C_6$—$C_{18}$ fatty acid catalyst such as potassium octoate is used to reduce foam shrinkage. The amount of the catalyst may vary, but generally ranges from about 0.5 to 4 parts, e.g. 0.7 to 3 parts per 100 parts of MDI.

In order to enhance the reacting time particularly since the composition is to be sprayed as A and B side mixtures onto vertical or overhead substrates, a polyvalent $+2$, $+3$ or $+4$ metal accelerator should be used in combination with the trimerization catalyst, such as a metal paint dryer compound like a organo-lead salt such as a fatty acid lead salt like lead octoate. The amount of the accelerator compound may vary such as from about 0.1 to 3 parts, e.g. 0.2 to 1.5 parts per 100 parts of MDI.

The flexible foam compositions of the invention and the method of preparing such foam compositions shall be described for the purposes of illustration only in connection with certain preferred examples; however, it is recognized that various changes, modifications, and improvements may be made by those persons skilled in the art all falling within the spirit and scope of the invention.

DESCRIPTION OF THE EMBODIMENTS

Example 1

A polyurethane foam composition was prepared by admixing and permitting the reaction of an A-side and a B-side component as follows:

A Side

50 parts MDI functionality 2.1 (168 Rubicon Chemical Co.)

B Side

100 parts Ethylene oxide capped polypropylene glycol polyol (EOPPG) MW 4000 hydroxyl number 35 (E474 Union Carbide Corp.)
3 parts Water as blowing agent
1 part Cell control agent—silicone (5305 Union Carbide Corp.)
0.3 parts Amine catalyst (triethylene diamine 33LV Air Products Co.)
0.05 Tetravalent tin catalyst—dibutyl dilauryl tin
Density: 3 PCF
Open Cell: 100%, no crushing
Tear Strength: fair to poor
Resiliency: excellent
Fire: slow burn The polyurethane MDI based foam prepared in Example 1 has excellent characteristics except for tear or tensile strength.

Example 2

A foam composition was prepared as set forth in Example 1 except that 5 parts by weight of tetraethylene glycol as a cross-linking agent was added to the B-side mixture. The tetraethylene glycol having a hydroxyl number of 530 to 550. The foam so prepared had the following characteristics:
Density: 2.7
Open Cell: 100%, no crush
Tear Strength: fair to poor
Resiliency: excellent
Fire: slow burn

Example 3

A polyurethane foam composition was prepared wherein a prepolymer was employed using the ethylene oxide-capped polyol with the low functionality MDI. The prepolymer was prepared by reacting 100 parts by weight of the low functioning MDI of Example 1 with 65 parts per weight of the ethylene oxide-capped polypropylene glycol polyol, the components being mixed and heated to 180° F. for about 2 hours to provide a prepolymer having a free issocyanate content of about 15 percent. The prepolymer so prepared was then employed in place of the low functioning MDI as in Example 2. The foam composition being as follows:
95 parts EOPPG (E474 Union Carbide)
5 parts Tetraethylene glycol
3 parts $H_2O$
0.03 part amine catalyst (33LV) triethylene
0.05 part dibutyl, dilauryl tin
1 part silicone (5305 Union Carbide)
100 parts MDI prepolymer (Rubicon 168-EO-PPG E474)
Density: 2.5
Resiliency: excellent
Tear: good to excellent
Open Cell: 100%, no crush
Fire: slow burn The polyurethane foam produced in Example 3 had significantly improved tear or tensile strength by employing the combination of the MDI prepolymer and the tetraethylene glycol.

Example 4

The polyurethane foam composition was prepared by employing the composition of Example 3 wherein 5 parts of a chlorinated phosphate, flame-retardant agent was added to the formulation of Example 3 (antiblaze 80 from Mobile Chemical). The resulting foam had all of the properties illustrated in Example 3, except that the foam did not burn after the fire was removed and exhibited no melting, but charring.

The foam material provided in Examples 3 and 4 provided a polyurethane foam with a low density, open-cell nature, and having good tear or tensile strength and with the addition of a excellent flame-retardant properties.

Example 5

A closed cell flexible foam composition was prepared having the following composition:

A side

50 parts Rubicon 168

B side

95 parts E-474 Union Carbide Corp.
5 parts Tetraethylene glycol
2 parts silicone (5422 Union Carbide Corp.)
0.3 part amine catalyst 33LV (Air Products Co.)
0.05 part dibutyl, dilauryl tin catalyst
3 $H_2O$
15 F-11 blowing agent (Dupont)

The foam had the following properties:
Cream time: 30 seconds
Tack time: 2 minutes
Density: 3PCF
Shrinkage: 25%
Tear Strength: poor

Example 6

The foam so prepared had poor tear strength and also high shrinkage. Example 5 was repeated except with the use of 1 part of the B side with the foam so prepared having the following properties:
Cream time: 30 seconds
Tack free: 2 minutes
Density: 2.7
Shrinkage: 2%
Tear strength: poor As shown in Example 6, the use of the potassium octoate, a trimerization catalyst, drastically reduced shrinkage of the foam composition of Example 5; however, the foam still exhibited poor tear strength.

Example 7

A MDI-EOPPG prepolymer was prepared as described in Example 3. The closed cell flexible foam composition of Example 6 with the trimerization catalyst, but using the MDI prepolymer was made as follows:

Cream time: 30 seconds
Tack free time: 2 minutes
Density: 2.7
Shrinkage: 2%
Tear: good The foam so prepared had both reduced shrinkage and good tear strength.

Example 8

Example 7 was repeated except with high urethane catalyst concentration as follows: dibutyl, dilauryl tin 0.1 part and triethylene diamine 0.5 parts with the following results:

Cream time: 30 seconds
Tack free time: 2 minutes
Density: 2.7
Shrinkage: 2%
Tear: good The higher urethane catalyst concentration did not increase the cream or tack free time.

Example 9

The foam composition of Example 7 was repeated but with the addition of 0.5 parts on the B side of lead octoate as an accelerator compound with the following results:

Cream time: 1 second
Tack free time: 9 seconds
Density: 2.5
Shrinkage: 1%
Tear: good The results indicate that the addition of lead octoate significantly reduced the cream and tack free time without any detrimental affect on shrinkage or tear strength. The foam composition so prepared is useful as a sprayable (A and B admixture) composition particularly for a 1:1 fixed-volume spray system for spraying a closed cell foam onto vertical and overhead surfaces.

What is claimed is:

1. A flexible polyurethane foam composition characterized by a high tensile or tear strength, which foam composition is prepared by reacting
   (a) 100 parts by weight of a MDI-polyol prepolymer, which prepolymer is prepared by reacting 100 parts of MDI having a functionality of about 2.4 or less with from about 35 to 75 parts by weight of an ethylene oxide-capped polyol;
   (b) about 2 to 10 parts by weight of a tetraethylene glycol; and
   (c) about 90 to 120 parts by weight of an ethylene oxide-capped polypropylene glycol polyol, the reaction carried out in the presence of a blowing amount of a blowing agent and a catalytic amount of a polyurethane catalyst to produce a flexible polyurethane foam of high tensile or tear strength.

2. The foam composition of claim 1 wherein the MDI has a functionality ranging from about 2.0 to about 2.2.

3. The foam composition of claim 1 wherein the ethylene oxide-capped polypropylene glycol polyol has a hydroxyl number ranging from about 25 to 50.

4. The foam composition of claim 1 wherein the ethylene oxide-capped polyol of the prepolymer is an ethylene oxide-capped polypropylene polyol.

5. The foam composition of claim 1 wherein the ethylene oxide-capped polyol employed in preparing the prepolymer in the reaction is the same as the ethylene oxide-capped polypropylene glycol polyol.

6. The foam composition of claim 1 wherein th ethylene oxide-capped polyol employed in the prepolymer ranges from about 40 to 65 parts by weight.

7. The foam composition of claim 1 wherein the polyurethane catalyst comprises a combination of a tetravalent organo tin catalyst and an amine catalyst.

8. The foam composition of claim 1 wherein the blowing agent comprises water, a halocarbon or a combination thereof.

9. The foam composition of claim 1 wherein the polyurethane composition includes from about 2 to 12 parts by weight per 100 parts of MDI as a flame-retardant agent.

10. The foam composition of claim 8 wherein the flame-retardant agent comprises a chlorinated phosphate.

11. The foam composition of claim 1 which includes a cell control amount of a silicone cell-control agent.

12. The foam silicone cell control agent composition of claim 1 wherein the blowing agent comprises water and the foam prepared is an open cell foam.

13. The foam composition of claim 1 wherein the blowing agent comprises a halocarbon and which foam composition includes a shrinkage reducing amount of a surface-metal trimerization catalyst.

14. The foam composition of claim 13 wherein the trimerization catalyst comprises a potassium fatty acid salt in an amount of from about 0 to 3 parts per 100 parts of a MDI prepolymer.

15. The foam composition of claim 13 which inludes a silicone cell control agent in an amount to promote the formation of a flexible closed cell foam.

16. The foam composition of claim 13 which inludes a reactive accelerating amount of an organo-lead compound to reduce the cream time and tack free time of the foam composition.

17. The foam composition of claim 1 which includes a blowing amount of a fluorocarbon as a blowing agent, a silicone agent to provide a closed cell foam, and a shrinkage-reducing amount of potassium octoate, and a cream time reducing amount of lead octoate.

18. A flexible closed cell polyurethane foam composition characterized by high tensile or tear strength and reduced shrinkage which foam composition is prepared by reacting:
   (a) an A side composition comprising 100 parts by weight of an MDI-polyol prepolymer, which prepolymer is prepared by reacting 100 parts of MDI having an average functionality of about 2.0 to 2.2 with from about 40 to 65 parts by weight of an ethylene oxide-capped polypropylene polyol with a B side composition comprising
   (b) from about 4 to 8 parts by weight of a tetraethylene glycol;
   (c) about 90 to 120 parts by weight of the ethylene oxide-capped polypropylene glycol polyol employed to prepare the prepolymer; and
   (d) the reaction carried out in the presence of about 1 to 15 parts by weight of a liquid fluorocarbon blowing agent; a catalytic amount of a co-catalyst system comprising an amine catalyst and a tetravalent organo-tin catalyst; a cell control amount of a silicone agent; a shrink reducing amount of a potassium fatty acid salt, and a cream time reducing amount of a lead fatty acid salt to reduce the cream time to less than about 1 second.

19. A flexible open cell polyurethane foam composition characterized by high tensile or tear strength and improved flame retardancy, which foam composition is prepared by reacting:
   (a) an A side composition comprising 100 parts by weight of an MDI-polyol prepolymer, which prepolymer is prepared by reacting 100 parts of MDI having an average functionality of about 2.0 to 2.2 with from about 40 to 65 parts by weight of an ethylene oxide-capped polypropylene polyol with a B side mixture comprising:
   (b) from about 4 to 8 parts by weight of a tetraethylene glycol;
   (c) about 90 to 120 parts by weight of the ethylene oxide-capped polypropylene glycol polyol employed to prepare the prepolymer:
   (d) the reaction carried out in the presence of about 0.5 to 5 parts by weight of water as a blowing agent, a catalytic amount of a co-catalyst comprising a diamine catalyst in combination and a tetravalent organo tin catalyst, a cell control amount of a silicone agent, and from about 2 to 12 parts by weight of MDI of a phosphate as a flame-retardant agent.

20. An MDI-polyol prepolymer suitable for use in preparing a flexible polyurethane foam composition, which MDI prepolymer is prepared by admixing and reacting together 100 parts by weight of an MDI having an average functionality of about 2.4 or less with from about 35 to 75 parts by weight of an ethylene oxide-capped polypropylene polyol, the reaction carried out by admixing the MDI and the ethylene oxide-capped polyol and heating the reaction mixture to a temperature of 100° F. or more for a period of time sufficient to carry out the reaction to form the prepolymer.

21. The prepolymer of claim 21 wherein the MDI has an average functionality of from about 2.0 to 2.2 and wherein the ethylene oxide-capped polypropylene polyol has a hydroxyl number ranging from about 25 to 50.

22. The prepolymer of claim 20 wherein the MDI-prepolymer has a free NCO content of about 12 to 18 percent.

* * * * *

UNITED STATES PATENT AND TRADEMARK OFFICE
CERTIFICATE OF CORRECTION

PATENT NO. : 4,525,490
DATED : June 25, 1985
INVENTOR(S) : Stuart B. Smith

It is certified that error appears in the above-identified patent and that said Letters Patent is hereby corrected as shown below:

Column 8, line 16, delete "as" and insert --of--.

Column 8, line 18, delete "8" and insert --9--.

Signed and Sealed this

Twelfth Day of November 1985

[SEAL]

Attest:

DONALD J. QUIGG

Attesting Officer

Commissioner of Patents and Trademarks